United States Patent [19]

Maehara

[11] Patent Number: 5,319,299

[45] Date of Patent: Jun. 7, 1994

[54] CHARGING CONTROL APPARATUS FOR VEHICLE

[75] Inventor: Fuyuki Maehara, Kariya, Japan

[73] Assignee: Nippondenso Co., Ltd., Kariya, Japan

[21] Appl. No.: 888,284

[22] Filed: May 26, 1992

Related U.S. Application Data

[63] Continuation of Ser. No. 591,518, Oct. 2, 1990, abandoned.

[30] Foreign Application Priority Data

Oct. 2, 1989 [JP] Japan .................. 1-257485

[51] Int. Cl.$^5$ .................................. H02J 7/14
[52] U.S. Cl. ........................... 322/28; 322/8; 322/73
[58] Field of Search ...................... 322/8, 28, 73

[56] References Cited

U.S. PATENT DOCUMENTS

| 3,631,258 | 12/1971 | Eisenstadt | 322/28 X |
| 3,858,108 | 12/1974 | Bray | 322/28 |
| 4,275,344 | 6/1981 | Mori et al. | 322/28 |
| 4,459,489 | 7/1984 | Kirk et al. | 322/8 X |
| 4,636,706 | 1/1987 | Bowman et al. | 322/28 |
| 4,831,322 | 5/1989 | Mashino et al. | 322/28 |

FOREIGN PATENT DOCUMENTS

| 330561 | 8/1989 | European Pat. Off. |
| 3815842 | 11/1988 | Fed. Rep. of Germany |
| 2634960 | 2/1990 | France |
| 59-83600 | 5/1984 | Japan |
| 59-83600 | 5/1984 | Japan |
| 62-64299 | 3/1987 | Japan |

Primary Examiner—R. J. Hickey
Attorney, Agent, or Firm—Cushman, Darby & Cushman

[57] ABSTRACT

A charging control apparatus for a vehicle, which controls a power generation of an AC generator for charging a battery, comprises: a switching circuit connected in series to a field winding of the generator; a comparator for detecting a voltage of a battery and comparing the battery voltage with a sawtooth wave of a predetermined period; a memory device for storing a value regarding a duty factor of an output of the comparator at the same period as the predetermined period of the sawtooth; a control value increasing/decreasing circuit for increasing or decreasing a control value as an output, thereby making the stored value coincide with the control value; and an AND circuit to calculate AND of the control value and an output of the comparator. By controlling the switching circuit by an output of the AND circuit, when an electric load is applied the duty factor of a pulsed field current which is supplied to the field winding is gradually increased from the present value of the duty factor, thereby preventing a sudden increase of a load onto the engine.

5 Claims, 7 Drawing Sheets

CHARGING CONTROL APPARATUS FOR VEHICLE

This is a continuation of application Ser. No. 07/591,518, filed on Oct. 2, 1990, which was abandoned upon the filing hereof.

BACKGROUND OF THE INVENTION

1. Field of the Invention

The present invention relates to a charging control apparatus for a vehicle for controlling the power generation of a generator to charge a battery for a vehicle and, more particularly, to a charging control apparatus which controls a rate of increase of a field current of the generator when an electric load was applied to the generator.

2. Description of the Related Background Art

Hitherto, there has been proposed a charging control apparatus shown in JP-A-62-64299, wherein a battery voltage and a predetermined voltage are compared and when the battery voltage is lower than the predetermined voltage, an up/down counter is incremented and, contrarily, when the battery voltage is higher than the predetermined voltage, the up/down counter is decremented.

Figure 9:
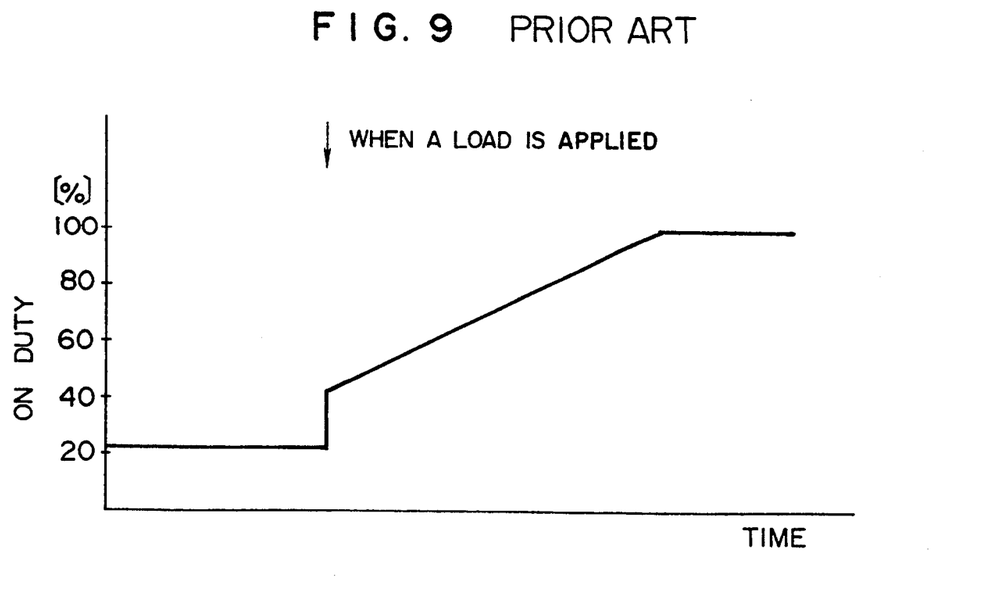
FIG. 9 is a graph showing a change in ON duty factor in the conventional apparatus.

In the above apparatus, by extending a period to increment the up/down counter, even if a battery voltage suddenly decreases by applying an electric load, the up/down counter is gradually increased, so that a field current is gradually increased as shown in FIG. 9. Therefore, the electric load is also slowly applied to an engine and an inconvenience such as an engine stall or the like can be prevented. However, the above conventional charging apparatus has a short coming as described below.

Figure 8:
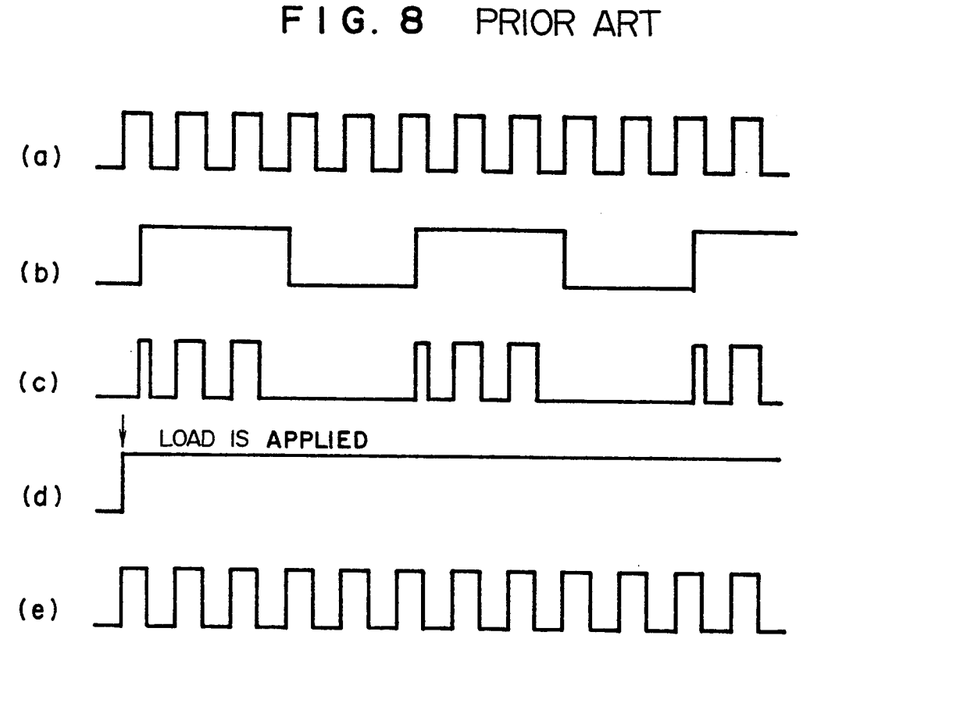
FIG. 8 is a waveform diagram of each section in a conventional apparatus.

In the above apparatus, with a rectangular wave signal from the up/down counter and an output of a comparator for comparing the battery voltage with a reference voltage, an AND is calculated, whose respective wave forms are shown in (a), (b) and (c) of FIG. 8. The field current is controlled according to the result of the AND, which includes non-exciting intervals where no field current is supplied.

When an electric load is suddenly applied to the battery, however, the battery voltage drops and a high (Hi) signal is outputted from the comparator as shown in (d) of FIG. 8. Consequently, the field current is controlled according to an AND signal having a wave form (e) of FIG. 8 which is identical to the wave form (a) of FIG. 8. Unlike the wave form (c) of FIG. 8, a lack of the non-exciting interval results in an increased exciting energy supplied to the field winding.

Therefore, as shown in FIG. 9, at a point where the electric load is applied, an ON dust factor of the pulsed field current is suddenly increased by a certain amount upon a mean value of the duty factor which has been so far maintained, and the duty factor is gradually increased thereafter.

Thus, there may be adversary influences onto the engine of the sudden increase in the duty factor of the pulsed field current when an electric load is applied.

SUMMARY OF THE INVENTION

It is, therefore, an object of the present invention to certainly prevent that a generator adversely influences an engine when an electric load is applied.

According to the invention, there is provided a charging control apparatus of an alternating generator for a vehicle driven by an engine, having a stator winding and a field winding, and charging a battery, wherein the apparatus comprises: switching means connected in series to the field winding; comparing means for detecting a voltage of the battery and comparing the battery voltage and a sawtooth wave of a predetermined period; memory means for storing a value regarding a duty factor of an output of the comparing means at the predetermined period; control value increasing/decreasing means for comparing the value regarding the duty factor obtained from the memory means with a duty factor of a control value, for increasing the duty factor of the control value at the predetermined period when the duty factor of the control value is smaller than the value regarding the duty factor obtained from the memory means, and for decreasing the duty factor of the control value when the duty factor of the control value is larger than the value regarding the duty factor obtained from the memory means; and AND means for calculating an AND between a value corresponding to the outputted control value from the control value increasing/decreasing means and an output of the comparing means, and wherein the switching means is controlled by an output of the AND means.

As described above, according to the invention, by making the period of the comparing means coincide with the period of the output of the control value increasing/decreasing means, when an electric load is applied, the duty factor can be gradually increased from the present value of the duty factor. Thus, it is prevented that a sudden load fluctuation is applied to the engine.

DESCRIPTION OF THE PREFERRED EMBODIMENTS

Figure 1:
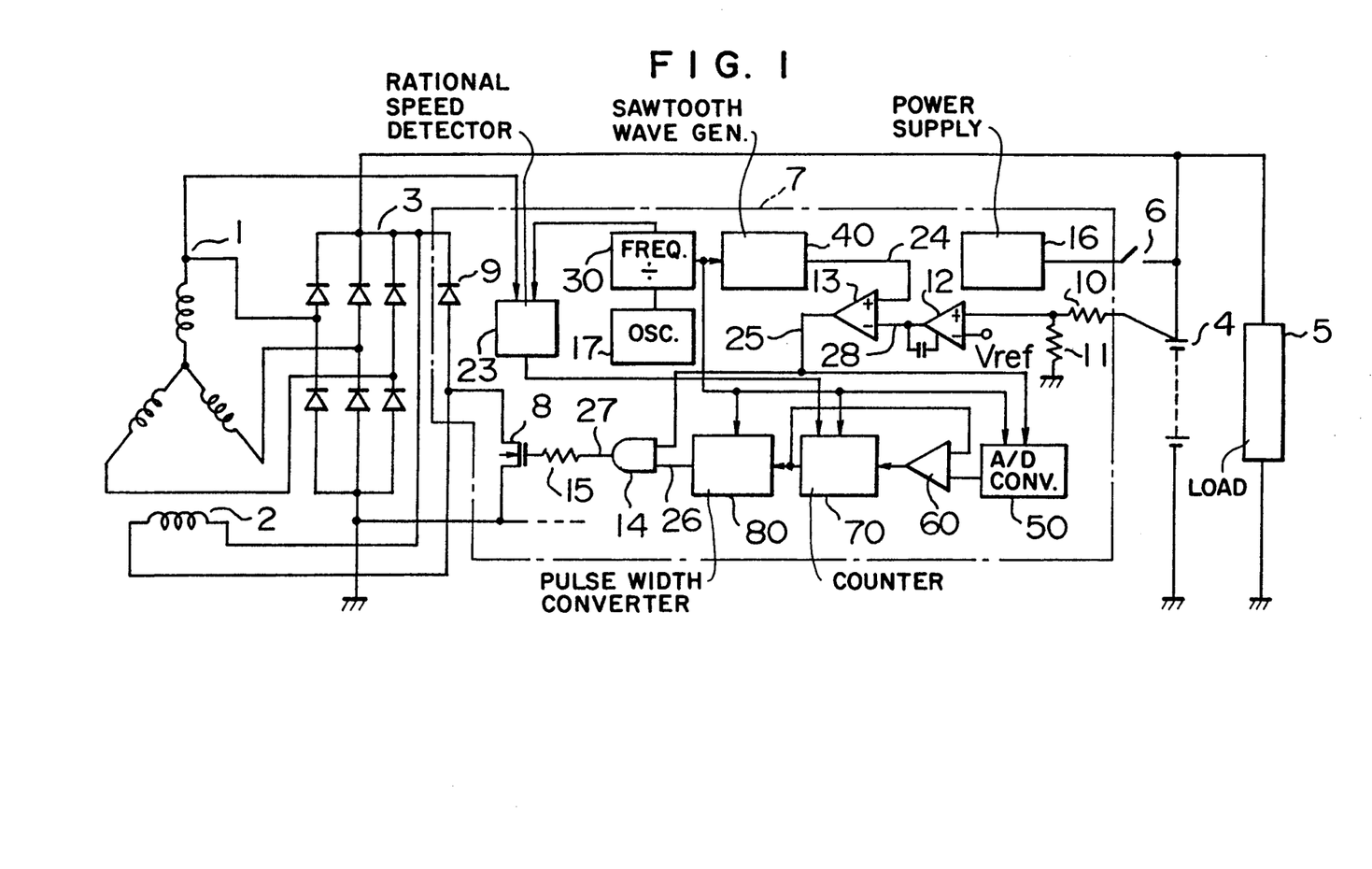
FIG. 1 is an electric circuit diagram showing an embodiment of a charging control apparatus for a vehicle according to the invention.

The present invention will be described hereinbelow on the basis of an embodiment shown in the drawings. In FIG. 1, an AC generator for a vehicle comprises: a Y-connected three-phase armature winding 1 which is a stator winding; a field winding 2 which is rotated by an engine (not shown); and a rectifier 3 to full-wave rectify an AC output of the armature winding 1. The generator is driven by the engine through a belt and a pulley in a well-known manner.

Reference numeral 4 denotes a battery, 5 indicates an electric load connected to the battery 4 and 6 an ignition switch.

A control circuit 7 controls a field current flowing in the field winding 2 of the generator and is assembled in an AC generator for a vehicle as disclosed in, for instance, U.S. patent Ser. No. 353,861.

The control circuit 7 will now be described in detail.

The current flowing through the field winding 2 is controlled by a field effect transistor (MOSFET) 8 as switching means. A flywheel diode 9 is connected to the field winding 2.

Reference numeral 12 denotes a differential amplifier. A (+) terminal of the amplifier 12 is connected to a node between a first resistor 10 connected to the battery 4 and a second resistor 11, while a reference voltage $V_{ref}$ is input to a (−) terminal. The differential amplifier 12 outputs a Hi level signal when a voltage of battery 4 is equal to or higher than a predetermined value (e.g., 14 V).

Reference numeral 13 denotes a comparator. An output of a sawtooth wave generating circuit 40, which will be explained hereinlater, is inputted to a (+) terminal and an output of the differential amplifier 12 is inputted to a (−) terminal, respectively.

Reference numeral 14 denotes an AND circuit. An output of the comparator 13 and an output of a pulse width converting circuit 80, which will be explained hereinlater, are inputted to the AND circuit 14. An output of the AND circuit 14 is inputted to a gate of the MOSFET 8 through a third resistor 15.

Reference numeral 16 denotes a power supply circuit to generate a power source for making each circuit in the control circuit 7 operative and a reference voltage from a battery voltage which is supplied via the IG switch 6.

Reference numeral 17 denotes a reference oscillating circuit which outputs a signal at a period of 4 [μsec].

Figure 3:
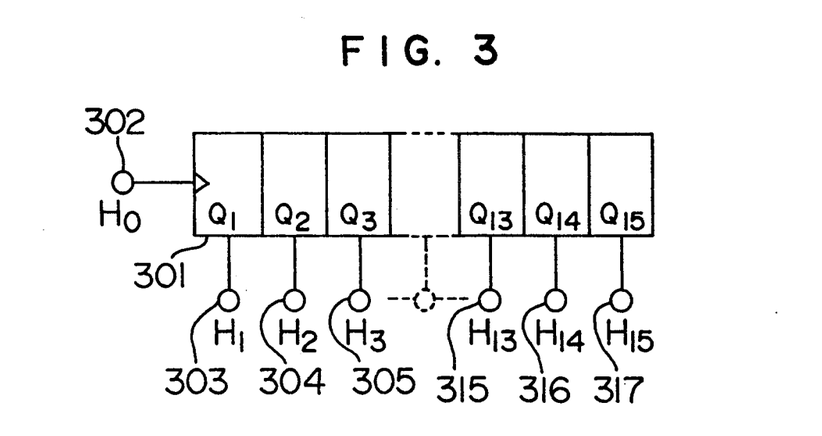
FIG. 3 is a schematic diagram showing a frequency dividing circuit.

Reference numeral 30 denotes a frequency dividing circuit to obtain a signal of a desired oscillating period which is derived by frequency dividing a reference oscillating signal of the reference oscillating circuit 17. The frequency dividing circuit 30 is shown in detail in FIG. 3. Reference numeral 301 denotes a counter and 302 indicates a clock input terminal which is connected to an output terminal of the reference oscillating circuit 17. Reference numerals 303 to 317 denote output terminals of the counter. The waveforms obtained by frequency dividing the clock input from the reference oscillating circuit 17 into 1/1 to 1/15 are inputted to the output terminals 303 to 317. Reference numeral 40 denotes the sawtooth wave generating circuit to generate a voltage waveform like a sawtooth wave from the signal from the frequency dividing circuit by the D/A conversion. The sawtooth wave generating circuit 40 is shown in detail in FIG. 4.

Figure 2:
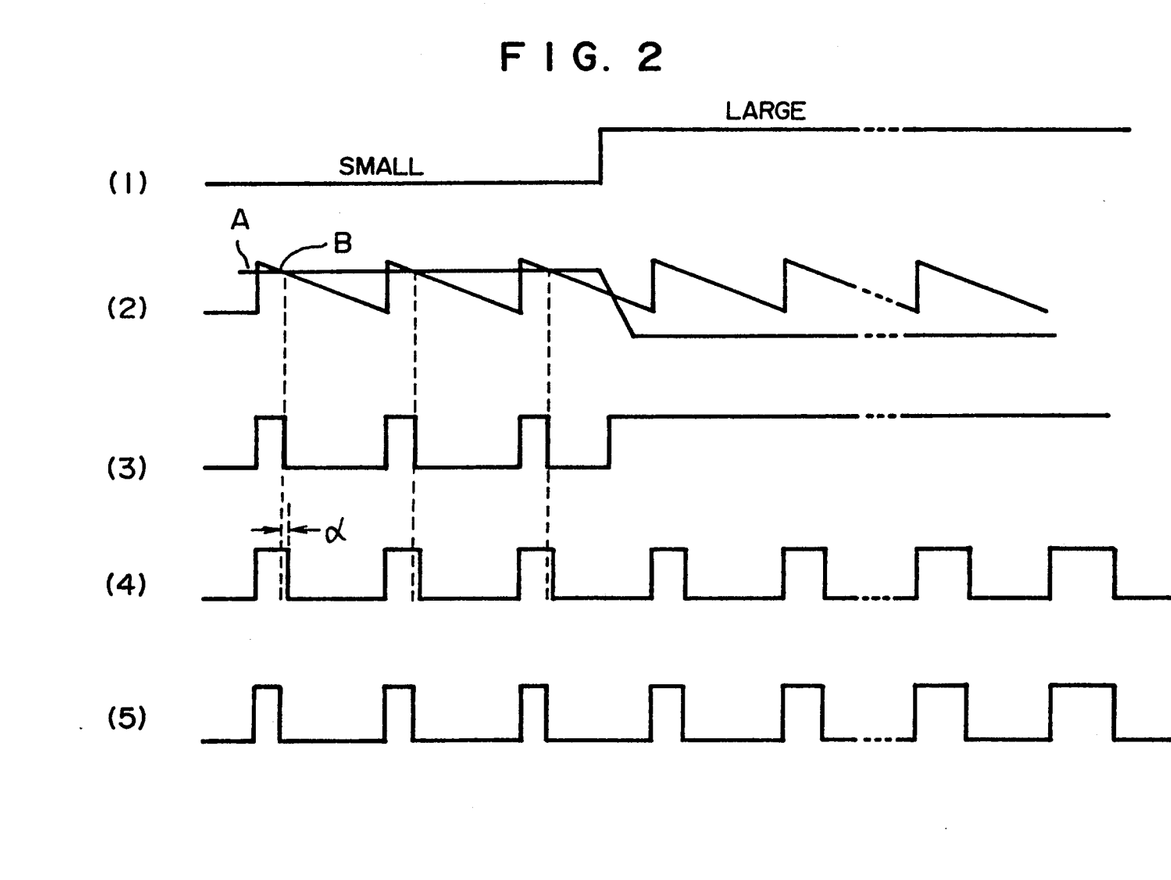
FIG. 2 is a waveform diagram of each section in the embodiment.
Figure 4:
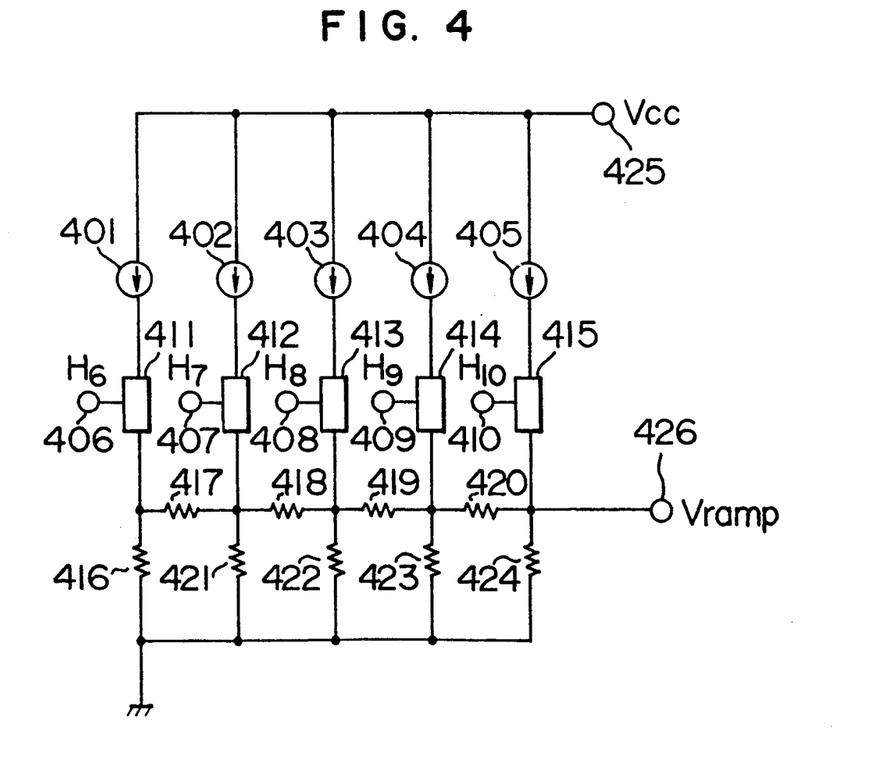
FIG. 4 is an electric circuit diagram showing a sawtooth wave generating circuit.

A regulated voltage which is obtained from the power supply circuit 16 is supplied to a terminal 425. Reference numerals 401 to 405 denote constant current circuits and 411 to 415 indicate switches for turning on and off currents which are supplied from the constant current circuits to rudder resistors 416 to 424. Terminals 406 to 410 of the switches 411 to 415 are connected to the output terminals 308 to 313 of the frequency dividing circuit 30 shown in FIG. 3, respectively. The signals from the frequency dividing circuit 30 are sequentially inputted the terminals 406 to 410, the switches 411 to 415 are sequentially turned on, and currents flow through the resistors 416 to 424. Thus, the voltage is sequentially reduced and a sawtooth waveform of the period of 4 [msec] is outputted to a terminal 426 as shown in FIG. 2.

The terminal 426 is connected to the (+) terminal of the comparator 13 shown in FIG. 1.

By detecting the timing of the output signal of the comparator 13, an A/D converting circuit 50 detects a duty factor of an exciting signal to the field winding 2 which is necessary to control the battery voltage to the set voltage, and converts the detected duty factor into the digital signal.

Reference numeral 60 denotes a magnitude comparator for comparing an output signal of the A/D converting circuit with a value from up/down counter, which will be explained hereinlater. Reference numeral 70 denotes the up/down counter serving as control value increasing/decreasing means for executing an UP (increment) or DOWN (decrement) operation on the basis of an output signal of the magnitude comparator.

The A/D converting circuit 50, magnitude comparator 60, and up/down counter 70 will now be described in detail with reference to FIG. 5.

Output terminals $H_7$ to $H_{10}$ of the frequency dividing circuit 30 are connected to terminals 501 to 504. The output terminals 501 to 504 are connected to $D_1$ to $D_4$ terminals 565 to 568 of a D type flip-flop 514 and are also inputted to a 4-input AND circuit 508. An output signal of the 4-innut AND circuit 508 is connected to a D input terminal of a D type flip-flop 509 and is also connected to an input terminal of an inverter 510.

An output $H_6$ of the frequency dividing circuit 30 is connected to a clock input terminal 506 of the D type flip-flop 509. An inverted output $\overline{Q}$ of the flip-flop 509 is inputted to an NAND circuit 511. On the other hand, an output 25 of the comparator 13 is connected to a terminal 507 and to an input terminal of the NAND circuit 511. An output terminal of the inverter 510 and an output terminal of the NAND circuit 511 are connected to an input terminal of an AND circuit 512. An output terminal of the AND circuit 512 is connected to a clock input terminal 570 of the 4-input D flip-flop 514. $Q_1$ to $Q_4$ outputs 516 to 519 of the flip-flop 514 are inputted to input terminals $A_0$ to $A_3$ (520 to 523) of a magnitude comparator 50 (515).

The value which was obtained by A/D converting a duty signal of the MOSFET 8 is outputted to the $Q_1$ to $Q_4$ output terminals 516 to 519 of the flip-flop 514.

That is, the comparison signal 25 obtained by comparing a sawtooth wave 24 of the sawtooth wave generating circuit 40 with an output 28 of the differential amplifier 12 by the comparator 13 is inputted to the terminal 507. When a signal at a B point in FIG. 2 where the sawtooth wave 24 and the output 28 is crossing is inputted, a Hi signal is inputted to the clock input terminal 570 of the flip-flop 514. By such a Hi signal, the signals which are inputted to the $D_1$ to $D_4$ input terminals 565 to 568 are set to the $Q_1$ to $Q_4$ output terminals of the flip-flop 514. Since the signals which are inputted to the the $D_1$ to $D_4$ input terminals are the outputs of the frequency dividing circuit 30, a period of time from an A point corresponding to the leading edge of the sawtooth wave shown in FIG. 2 to the B point is expressed.

On the other hand, $Q_2$ to $Q_5$ output terminals 547 to 550 of an up/down counter 545 are connected to $B_0$ to $B_3$ output terminals 526 to 529 of the magnitude comparator 515. The magnitude comparator 515 compares the binary signals of the $A_0$ to $A_3$ input terminals 520 to 523 with the binary signals of the $B_0$ to $B_3$ output terminals 526 to 529. When A<B, an H level signal is outputted from a terminal 553. When A≧B, an L level signal is outputted from the terminal 553. The output signal of the terminal 553 is connected to a D input terminal 554 of a D type flip-flop 525.

The output signal $H_{10}$ of the frequency dividing circuit 30 is outputted to a clock input terminal 569 of the D type flip-flop 525. A Q output 556 of the flip-flop 525 is connected to an input terminal of a 3-input NAND circuit 544 and a $\overline{Q}$ output 555 is connected to an input terminal of a 3-input NAND circuit 543.

A selector circuit is constructed by AND circuits 535, 537, 538, and 540, inverters 536 and 539, and OR circuits 541 and 542. When a terminal 530 is set to the H level, the output $H_{10}$ of the frequency dividing circuit 30 is selected as an output 571 of the OR circuit 541 and, similarly, the output $H_{10}$ of the frequency dividing circuit 30 is also selected as an output 572 of the OR circuit 542. When the terminal 530 is set to the L level, an output $H_{15}$ of the frequency dividing circuit 30 is selected as an output 571 and an output $H_{13}$ of the frequency dividing circuit 30 is selected as an output 572. The output 571 is connected to an input terminal of the 3-input NAND circuit 543. The output 572 is connected to an input terminal of the 3-input NAND circuit 544.

An L level signal is outputted from the terminal 530 when a rotational speed detecting circuit 23, which will be explained hereinlater, detects that the engine rotational speed is equal to or less than 3000 [rpm].

An output 551 of the 3-input NAND circuit 543 is connected to an UP input terminal of the up/down counter 545. An output 552 of the 3-input NAND circuit 544 is connected to a DOWN input terminal of the up/down counter 545. On the other hand, the $Q_1$ to $Q_3$ outputs 546 to 550 of the up/down counter 545 are inputted to both of a 5-input NAND circuit 557 and a 5-input OR circuit 558. Outputs of the NAND circuit 557 and OR circuit 558 are inputted to the 3-input NAND circuits 543 and 544, respectively. $Q_1$ to $Q_5$ outputs 559 to 563 of the up/down counter 545 are outputted to the pulse width converting circuit 80.

Figure 6:
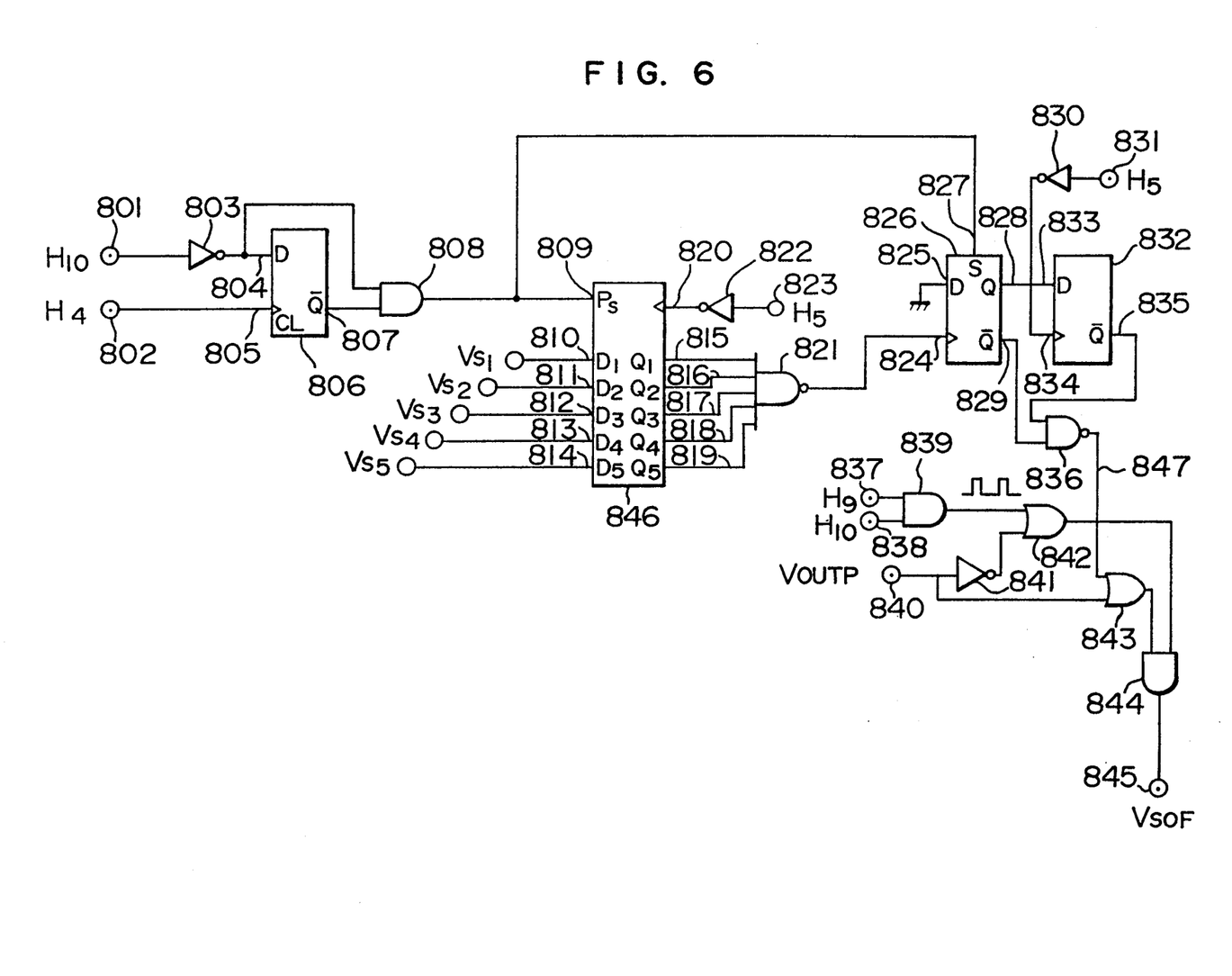
FIG. 6 is an electric circuit diagram showing a pulse width converting circuit.

FIG. 6 shows the pulse width converting circuit 80. The output $H_{10}$ of the frequency dividing circuit 30 is inputted to an inverter 803. An output of the inverter 803 is inputted to a D input terminal of a D type flip-flop 806 and to an AND circuit 808. The output $H_4$ of the frequency dividing circuit 30 is inputted to a clock input terminal 805 of the flip-flop 806.

A Q output 807 of the flip-flop 806 is inputted to the AND circuit 808. An output of the AND circuit 808 is inputted to a preset input terminal 809 of a programmable counter 846 and to a set input terminal 827 of a D type flip-flop 826 with an S(set) terminal.

Figure 5:
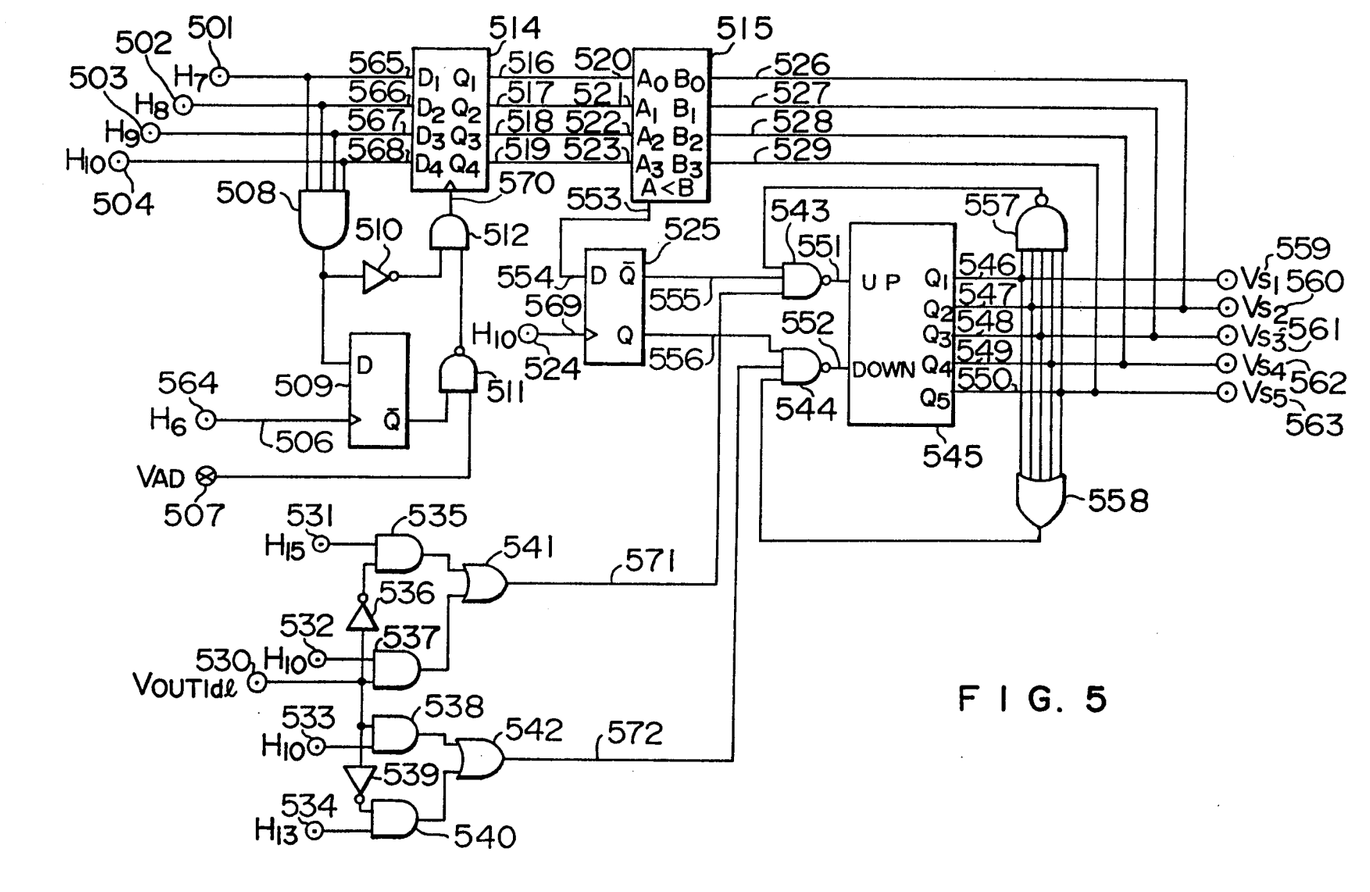
FIG. 5 is an electric circuit diagram showing an A/D converting circuit and an up/down counter.

$D_1$ to $D_5$ input terminals 810 to 814 of the programmable counter 846 are connected to the $Q_1$ to $Q_5$ output terminals 559 to 563 of the up/down counter 545 in FIG. 5, respectively. On the other hand, the signal obtained by inverting the output $H_5$ of the frequency dividing circuit 30 by an inverter 822 is inputted to a clock input terminal 820. $Q_1$ to $Q_5$ counter output terminals 815 to 819 are inputted to a 5-input NAND circuit 821. An output of the NAND circuit 821 is inputted to a clock input terminal 824 of the flip-flop 826. A Q output 828 of the flip-flop 826 is inputted to a D input terminal 833 of a D type flip-flop 832 and a $\overline{Q}$ output 835 is inputted to an NAND circuit 836. The signal obtained by inverting the output $H_5$ of the frequency dividing circuit 30 by an inverter 830 is inputted to a clock input terminal 834 of the D type flip-flop 832. A $\overline{Q}$ output 829 of the flip-flop 826 is inputted to the NAND circuit 836.

A selector is constructed by an inverter 841, OR circuits 842 and 843, and an AND circuit 844. When a signal at an input terminal 840 is set to the H level, an AND signal of the outputs $H_9$ and $H_{10}$ of the frequency dividing circuit 30 is selected by the selector and is outputted to a terminal 845. When the signal at the terminal 840 is set to the L level, an output signal of the NAND circuit 836 is selected by the selector and is outputted to the terminal 845. The signal at the terminal 845 is the same as the output 26 of the pulse width converting circuit 80 shown in FIG. 1 and is inputted to the AND circuit 14.

The pulse width converting circuit 80 generates pulses of a predetermined frequency having a duty factor based on the output of the up/down counter 70. When the rotational speed detecting circuit 23 detects that the engine rotational speed is equal to or lower than 500 rpm (and when it is determined that the power generation was stopped), the terminal 840 is at the L level and the pulse width converting circuit 80 generates pulses of a predetermined frequency having an ON duty factor of 25% to the terminal 845.

Reference numeral 23 denotes the rotational speed detecting circuit for detecting a period of a voltage waveform of one phase of the 3-phase armature winding 1, detecting the charging of the generator, and also detecting that the vehicle is in the idling state.

The operation will now be described on the basis of the above construction.

First, when the IG switch 6 is turned on, the battery voltage is supplied to the power supply circuit 16. A voltage regulating circuit, a constant current circuit, and a reference voltage circuit (all of them are not shown) operate, and the whole circuit starts the function.

i) Power generation stop mode

When the engine rotational speed is low and the power generation is not executed, the rotational speed detecting circuit 23 detects the stop of the power generation and sends a power generation stop signal to the pulse width converting circuit 80. Thus, since the terminal 840 shown in FIG. 6 is set to the H level, the outputs $H_9$ and $H_{10}$ of the frequency dividing circuit 30 are transmitted through an AND circuit 839 and a rectangular wave of a duty factor of 25% appears at the terminal 845.

On the other hand, since the battery voltage is lower than the set voltage at this time, the output of the comparator 13 is set to the H level. The H level signal and the signal of an ON duty factor of 25% are inputted to the AND circuit 14 in FIG. 1. Thus, the signal of an ON duty factor of 25% is applied to a gate of the MOSFET 8 via the resistor 15.

Therefore, the MOSFET 8 is made conductive at the ON duty factor of 25% and supplies a current to the field winding 2, so that the initial excitation of the generator is performed.

ii) Idle stabilization mode

When the engine starts and the rotational speed of the generator is equal to or higher than a set rotational speed (500 rpm) and is equal to or less than the idle rotational speed upper limit value, the rotational speed detecting circuit 23 detects a power generation start signal and sends the power generation start signal to the pulse width converting circuit 80. Thus, since the terminal 840 shown in FIG. 6 is set to the L level, the signal whose duty factor is gradually increased from the ON duty factor of 25% appears at the terminal 845.

On the other hand, when the rotational speed of the generator rises and the output of the generator increases and the battery voltage approaches a value near the adjustment voltage, the output of the differential amplifier 12 increases. The output signal of the differential amplifier 12 is compared with the sawtooth wave of the sawtooth wave generating circuit 40 by the comparator 13.

Thus, a duty factor signal of a predetermined frequency corresponding to $$\frac{I_{ALT \cdot MAX}}{I_L}$$

which is determined by the maximum power generation amount $I_{ALT.MAX}$ at the present rotational speed of the generator and a load amount IL is outputted to the AND circuit 14. As shown in FIG. 2(5), the MOSFET 8 is ordinarily driven by such a signal.

The output signal of the comparator 13 is inputted to the A/D converting circuit 50 (terminal 507 shown in FIG. 5). The signals $H_7$ to $H_{10}$ at the training edge (B point shown in FIG. 2) of the output signal of the comparator 13 are held in the 4-input D type flip-flop 514. Since the binary signals $H_7$ to $H_{10}$ correspond to the time from the leading edge A point of the sawtooth wave to the B point, the ON duty value of the output of the comparator 13 is eventually held.

The signal of the ON duty value held is inputted to the magnitude comparator 515 and compared with the output of the up/down counter 545. When the former value is smaller than the latter value, the H level signal is inputted to the D input terminal of the D type flip-flop 525. Contrarily, when the former value is larger than the latter value, the L level signal is inputted to the D input terminal of the flip-flop 525. The above value is periodically latched at the time point (signal $H_{10}$ of the frequency dividing circuit 30) when the sawtooth wave rises. When the Q output is at the H level, the up/down counter 545 is counted down through the NAND circuit 544. On the other hand, when the $\overline{Q}$ output is at the H level, the up/down counter 545 is counted up through the NAND circuit 543.

At this time, since the rotational speed of the generator is equal to or less than the idle rotational speed upper limit value (3000 rpm), the terminal 530 is set to the L level. Therefore, the period of the UP counting results in the output $H_{15}$ of the frequency dividing circuit 30 applied to a terminal 531. The period of the DOWN counting results in the output $H_{13}$ of the frequency dividing circuit 30 applied to a terminal 534.

The output value of the up/down counter 545 is converted into the pulses of the predetermined frequency whose period is the same as that of the sawtooth wave by the pulse width converting circuit 80 which is constructed by the programmable counter 846 in FIG. 6. The duty factor of the output from the pulse width converting circuit 80 is increased by α (α denotes an incremental duty factor of a few %) as a dead band range where a gradual increase of the duty factor is not executed, by a pulse width increasing circuit comprising the D type flip-flop 826 with the set terminal, D type flip-flop 832, and the like. By providing the dead band, a lowered response of the control apparatus to repeated and small disturbances in an engine rotation and/or a load current, due to the gradual increase of the duty factor, is avoided and resultant decrease in the battery voltage is prevented. Therefore, as shown in an operation waveform (4) of FIG. 2, when the electric load does not change, the duty factor of the output of the pulse width converting circuit 80 is increased by only the duty factor α as compared with the ON duty factor of the comparator 13.

The MOSFET 8 is driven by the output signal of the comparator 13 through the AND circuit 14 which receives the output of the comparator 13 and the output of the pulse width converting circuit 80.

Therefore, the output of the up/down counter 545 UP counts or DOWN counts at the UP counting period $H_{15}$ or the DOWN counting period $H_{13}$, thereby operating to coincide with the ON duty value of the comparator 13. Therefore, the voltage of the battery 4 is always maintained to a predetermined value.

That is, the MOSFET 8 is driven by the output signal of the comparator 13 in a stable state having no fluctuation in electric load or the like, thereby maintaining the voltage of the battery 4 to a predetermined voltage.

A state in which the electric load 5 was applied in the above stable state will now be described.

When the large load 5 is applied as shown in FIG. 2(1), the battery voltage cannot be compensated by only the present output of the generator, so that the battery voltage drops as shown in FIG. 2(2). Therefore, the output of the comparator 13 is set to the H level and the $Q_1$ to $Q_4$ output terminals 516 to 519 of the flip-flop 514 output the H level signals.

Consequently, the output of the magnitude comparator 515 becomes $L_0$, and allows the D type flip-flop 525 to send a $H_i$ signal to the NAND circuit 543 at the period of the signal $H_{10}$ of the frequency dividing circuit 30. Because the output of the flip-flop 514 is larger than the output of the up/down counter 545.

Therefore, the UP counting period is set such as to count up the output of the up/down counter 545 one by one in accordance with the output $H_{15}$ of the frequency dividing circuit 30. Thus, since the output is counted up at a long period (about 131 msec) of $H_{15}$, the output of the pulse width converting circuit 80 gradually increases in accordance with the output of the up/down counter 545 as shown in FIG. 2(5).

Accordingly, the output of the AND circuit 14 gradually increases the ON duty factor of the MOSFET 8 in accordance with the output of the pulse width converting circuit 80. Since the power generation amount of the generator also merely gradually increases, the vibration of the engine and the loss of speed when the electric load is applied can be prevented.

On the other hand, in the above idle stabilization mode, the DOWN counting speed of the up/down counter 545 is made slow and it takes a time of one second until the ON duty factor of the MOSFET 8 changes from 100% to 0%. This is because it is intended to prevent that the value of the up/down counter 545 largely decreases due to a decrease in ON duty factor by the instantaneous fluctuation of the rotational speed.

iii) Running mode

When the rotational speed of the generator is equal to or higher than the idle rotational speed upper limit value (3000 rpm), the rotational speed detecting circuit 23 detects that the engine is in the running state and sets the terminal 530 in FIG. 5 to the H level. Thus, the UP and DOWN counting speeds of the up/down counter 545 are set on the basis of the output $H_{10}$ of the frequency dividing circuit 30 applied to terminals 532 and 533.

Therefore, the increasing and decreasing speeds of the ON duty factor of the MOSFET 8 are equal to 0.125 second in both of the cases from 0% to 100% and from 100% to 0%. The ON duty factor is not gradually increased.

This is because since the engine rotational speed is high in the running mode, even if the load of the generator increases due to a sudden increase in electric load, the engine rotational speed does not rapidly decrease.

Figure 7:
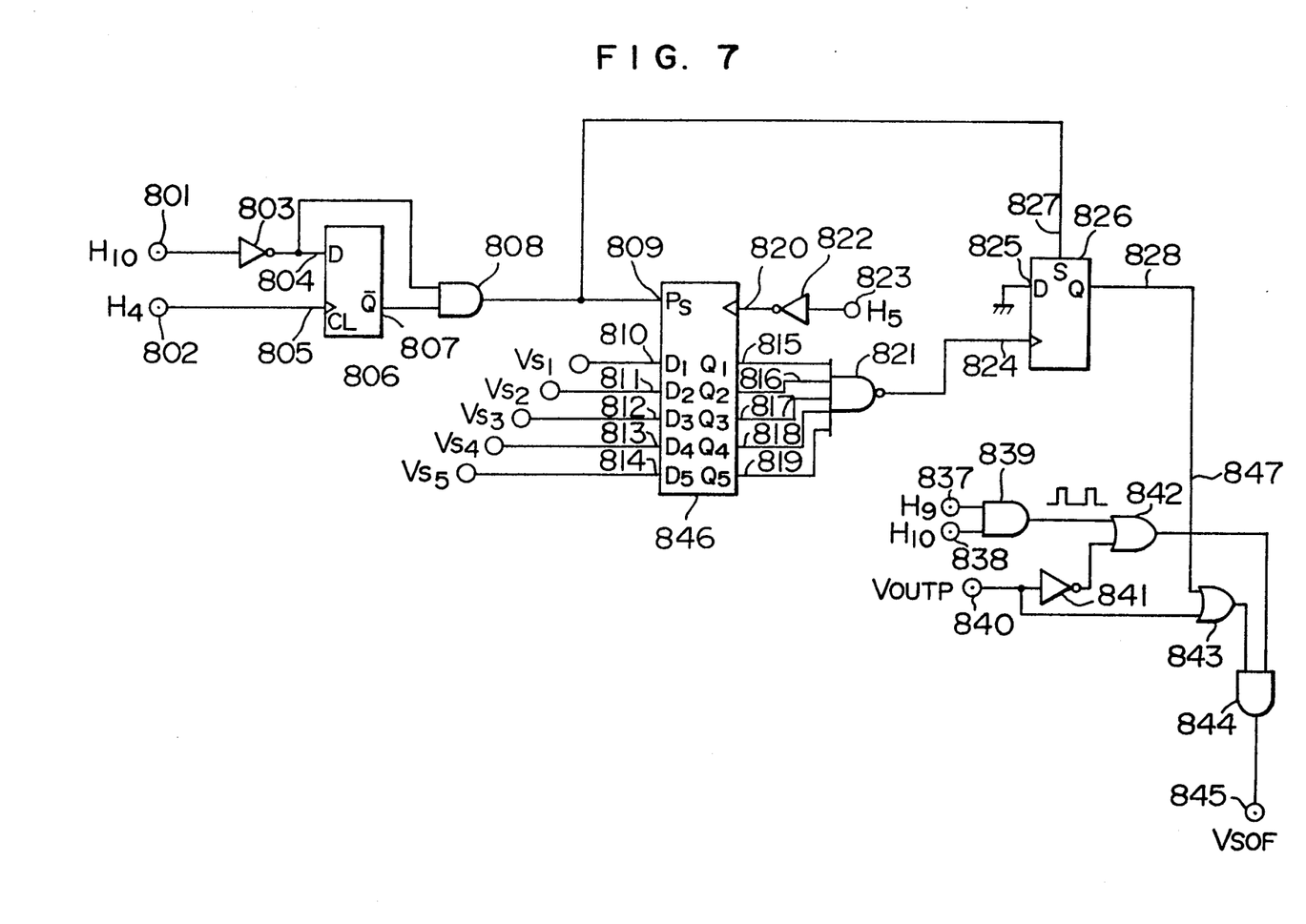
FIG. 7 is an electric circuit diagram showing another embodiment of the pulse width converting circuit in the apparatus of the invention.

In the above embodiment, the duty factor has been increased by $\alpha$ by the pulse width increasing circuit comprising the D type flip-flop 832 and the like of the pulse width converting circuit 80. However, as shown in FIG. 7, the D type flip-flop 832 may be omitted and the Q output 828 of the D type flip-flop 826 with the set terminal may be inputted to the OR circuit 843 omitting the increase amount of $\alpha$.

What is claimed is:

1. A charging control apparatus of an AC generator for a vehicle driven by an engine having a stator winding and a field winding and charging a battery, comprising:

switching means connected in series to the field winding;

comparing means for detecting a voltage of the battery and comparing the battery voltage with a sawtooth wave of a predetermined period;

memory means for storing a value regarding a duty factor of an output of the comparing means at said predetermined period;

control value increasing/decreasing means for comparing the value stored in the memory means and a control value, for increasing the control value at said predetermined period when the control value is smaller than the stored value, for decreasing the control value when the control value is larger than the stored value, and for outputting the control value; and AND means for calculating an AND of a value corresponding to the control value which is outputted from the control value increasing/decreasing means and an output of the comparing means, wherein the switching means is controlled by an output of the AND means.

2. A charging control apparatus according to claim 1, wherein the memory means is an analog to digital (A/D) converter for digitally converting the value regarding the duty factor of the output of the comparing means at said predetermined period, the control value increasing/decreasing means comprises an up/down counter and a comparator, the comparator comparing the A/D converted value with the control value as an output of the up/down counter, and the up/down counter being counted up or down at said predetermined period in accordance with the output of the comparator.

3. A charging control apparatus according to claim 1, wherein the control value from the control value increasing/decreasing means is pulse width converted by a pule width converting circuit, the pulse width converted signal being inputted to the AND means.

4. A charging control apparatus according to claim 1, wherein the comparing means compares a value corresponding to a difference between the battery voltage and a reference voltage with the sawtooth wave of the predetermined period and outputs a signal of a duty factor of the predetermined period.

5. A charging control method of controlling by switching means a field current flowing through a field winding of an AC generator for a vehicle which is driven by an engine and charges a battery, comprising the steps of:

detecting a voltage of the battery, comparing a value corresponding to a difference between the battery voltage and a predetermined reference voltage with a sawtooth wave of a predetermined period, and obtaining a value regarding a duty factor in a result of a comparison;

storing the value regarding the duty factor in the result of said comparison at said predetermined period;

comparing the stored value with a control value, increasing the control value at said predetermined period when the control value is smaller than the stored value, and decreasing the control value when the control value is larger than the stored value;

calculating an AND of a value corresponding to the increased or decreased control value and an output of the comparing means; and controlling a duty factor with which the switching means operates by the result of said AND.

* * * * *